United States Patent
Oliver

(10) Patent No.: US 7,580,386 B2
(45) Date of Patent: Aug. 25, 2009

(54) COOPERATIVE SCHEDULING OF MASTER AND SLAVE BASE STATION TRANSMISSIONS TO PROVIDE COEXISTENCE BETWEEN NETWORKS

(75) Inventor: Neal Conrad Oliver, Florham Park, NJ (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 11/109,901

(22) Filed: Apr. 19, 2005

(65) Prior Publication Data

US 2006/0251006 A1    Nov. 9, 2006

(51) Int. Cl.
*H04W 4/00* (2009.01)
(52) U.S. Cl. .............. 370/328; 370/341; 370/378; 370/326; 370/329; 455/448; 455/450; 455/461; 455/464; 455/509
(58) Field of Classification Search .......... 370/328, 370/326, 329, 341, 378; 455/448, 450, 451, 455/464, 509, 461
See application file for complete search history.

(56) References Cited

U.S. PATENT DOCUMENTS

| | | | |
|---|---|---|---|
| 5,732,076 A | * | 3/1998 | Ketseoglou et al. ........ 370/347 |
| 6,643,296 B1 | * | 11/2003 | Fukuhara ................... 370/445 |
| 2002/0018459 A1 | * | 2/2002 | Desblancs et al. .......... 370/350 |
| 2002/0093929 A1 | * | 7/2002 | Mangold et al. ........... 370/336 |
| 2003/0128684 A1 | * | 7/2003 | Hirsch et al. ............... 370/338 |
| 2003/0206543 A1 | * | 11/2003 | Fischer et al. .............. 370/338 |
| 2004/0109473 A1 | | 6/2004 | Lebizay et al. |
| 2004/0141522 A1 | * | 7/2004 | Texerman et al. .......... 370/466 |
| 2004/0264472 A1 | | 12/2004 | Lebizay et al. |
| 2004/0267948 A1 | | 12/2004 | Lebizay et al. |
| 2005/0013387 A1 | * | 1/2005 | Ojard ......................... 375/316 |
| 2005/0266845 A1 | * | 12/2005 | Aerrabotu et al. .......... 455/436 |

OTHER PUBLICATIONS

U.S. Appl. No. 10/853,485, filed May 24, 2004, Oliver et al.
U.S. Appl. No. 10/853,485, filed May 24, 2004—Title: Adapting Uplink/Downlink Subframe Ratio in Time Division Duplex Physical Frames—Inventor: Oliver et al. (Oliver, Neal; Gusak, Oleg; & Sohraby, Khosrow).
PCT/US2006/015007 International Search Report and Written Opinion Mailed Jul. 31, 2006.

* cited by examiner

*Primary Examiner*—Rafael Pérez-Gutiérrez
*Assistant Examiner*—Nimesh Patel
(74) *Attorney, Agent, or Firm*—John F. Travis

(57) ABSTRACT

Cooperative scheduling of master and slave base station transmissions is disclosed. Silent and deaf intervals are scheduled in a frame format of a first network to allow transmissions to occur in a second network without interference.

17 Claims, 4 Drawing Sheets

COOPERATIVE SCHEDULING OF MASTER AND SLAVE BASE STATION TRANSMISSIONS TO PROVIDE COEXISTENCE BETWEEN NETWORKS

BACKGROUND

Due to increasing uses for broadband communications, it is becoming more important to be able to provide high-speed, low-cost communication services to mobile subscribers. One potential use for mobile broadband communication services includes emergency services communications used by police, fire department and other emergency personnel, for example, to transmit streaming video from a moving police car or to transmit electronic maps to first-responders in an emergency. Accordingly, it is desirable to provide high bandwidth wireless communications to mobile subscribers. Issues with geographic coverage, FCC spectrum allocation, throughput and other various issues drive the cost of current solutions to an unacceptable level.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," and the like, indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

While the following detailed description may describe example embodiments of the present invention in relation to wireless networks utilizing Orthogonal Frequency Division Multiplexing (OFDM) modulation, the embodiments of present invention are not limited thereto and, for example, can be implemented using other modulation and/or coding schemes where suitably applicable. Further, while example embodiments are described herein in relation to wireless metropolitan area networks (WMANs), the invention is not limited thereto and can be applied to other types of wireless networks where similar advantages may be obtained. Such networks specifically include, but are not limited to, wireless local area networks (WLANs), wireless personal area networks (WPANs) and/or wireless wide area networks (WWANs).

The following inventive embodiments may be used in a variety of applications including transmitters and receivers of a radio system, although the present invention is not limited in this respect. Radio systems specifically included within the scope of the present invention include, but are not limited to, network interface cards (NCs), network adaptors, mobile stations, base stations, access points (APs), gateways, bridges, hubs and cellular radiotelephones. Further, the radio systems within the scope of the invention may include cellular radiotelephone systems, satellite systems, personal communication systems (PCS), two-way radio systems, two-way pagers, personal computers (PCs) and related peripherals, personal digital assistants (PDAs), personal computing accessories and all existing and future arising systems which may be related in nature and to which the principles of the inventive embodiments could be suitably applied.

Figure 1:
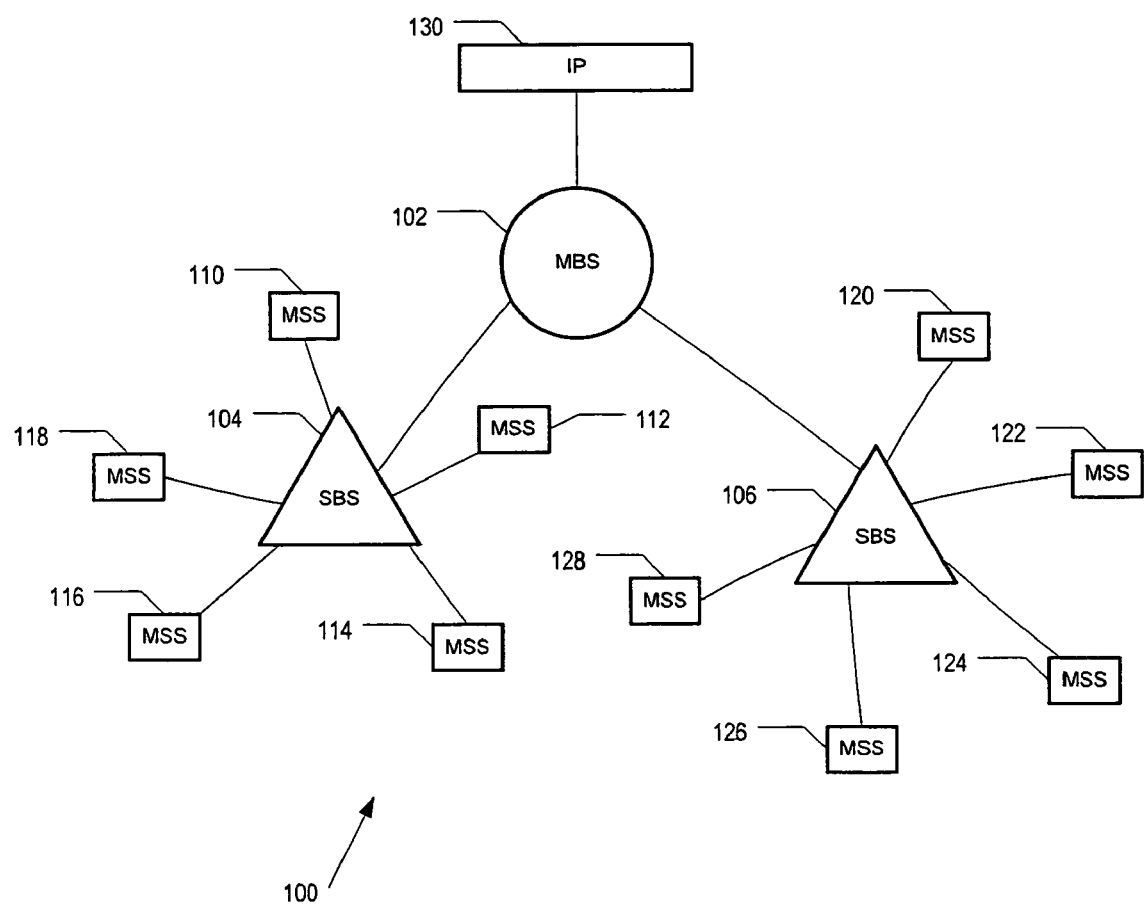
FIG. 1 illustrates a wireless communication system capable of providing broadband communications to mobile subscriber stations according to an embodiment of the present invention.

FIG. 1 illustrates a wireless communication system 100 capable of providing broadband communications to mobile subscriber stations according to an embodiment of the present invention. System 100 may be any type of wireless network such as a wireless metropolitan area network (WMAN), a wireless wide area network (WWAN), a wireless local area network (WLAN), wireless personal area networks (WPAN) or any other wireless network where two or more devices communicate via an air interface. System 100 includes one or more master base stations (MBS) 102 to communicate with one or more slave base stations (SBSs) 104 and 106. MBS 102, SBS 104, and SBS 106 are typically fixed in location. However, the invention is not limited in this respect. SBS 104 communicates with one or more mobile subscriber stations (MSSs) 110-118. SBS 106 communicates with one or more MSSs 120-128. MBS 102 may provide an access point to an external IP network 130. In one embodiment of the present invention, MBS 102 and/or SBS 104 and SBS 106 each have a scheduler, schedulers 132, 134, and 136, respectively.

System 100 may further include one or more other wired or additional wireless network devices as desired. In certain embodiments system 100 may use an air interface utilizing multi-carrier modulation such as OFDM, although the embodiments of the invention are not limited in this respect. OFDM works by dividing up a wideband channel into a larger number of sub-channels. By placing a subcarrier in each sub-channel, each subcarrier may be modulated separately depending on the signal interference to noise ratio (SINR) characteristics in that particular narrow portion of the band.

In operation, transmission may occur over a radio channel which may be divided into intervals of uniform duration called frames. There are many different physical layer protocols which may be used to encode data into frames. In certain example embodiments using OFDM, the physical frame may be divided into a time sequence of OFDM symbols. Each symbol may be composed of a collection of modulation symbols multiplexed in frequency (for example, using quaternary phase shift keying (QPSK), 16-bit or 64-bit quadrature amplitude modulation (QAM)), into which data are encoded, although the present invention is not limited in this respect.

A wireless link between MBS 102 and SBS 104 or SBS 106 may be according to a wireless standard, for example the IEEE 802.16 WirelessMAN standard published Apr. 8, 2002. A wireless link between one of SBS 104 and SBS 106 and a MSS, such as MSS 110 or MSS 120, respectively, may be according to the same or a different wireless standard. The invention is not limited in this respect. According to an embodiment of the present invention, a hierarchical architecture is implemented in which MBS 102, SBS 104 and SBS 106 form a different network than is formed by SBS 104 and MSSs 110-118 or by SBS 106 and MSSs 120-128. Spectrum and bandwidth constraints may require the use of spectral ranges on an SBS/MSS link that is close to the spectral range of an MBS/SBS link. Thus, the different networks may not operate transparently to each other. Further, because SBS 104 is part of a network formed between SBS 104 and MBS 102 and is also part of a network formed by SBS 104 and MSSs 110-118, SBS 104 should not transmit and receive at the same time in order to avoid self-interference.

According to an embodiment of the present invention, spectral range issues and/or self-interference by an SBS is avoided by providing cooperatively scheduled transmissions for the different networks. Further, master frames, that is, frames transmitted between an MBS and an SBS, and slave frames, that is, frames transmitted between an SBS and an MSS, each may have silent intervals and/or deaf intervals. A silent interval is an interval in which no transmission is made. A deaf interval is an interval in which any transmissions made are ignored. The silent and deaf intervals allow communication in another network to occur without interference. For example, a deaf or silent interval in a master frame may coincide with a transmission or reception interval of a slave frame and vice versa.

The sizing and scheduling of silent and deaf intervals may be accomplished in a variety of manners. In one embodiment of the present invention, silent and deaf intervals may be configured by a management interface. Silent and deaf intervals may be predetermined and configured in all MBSs and SBSs. In another embodiment of the present invention, silent and deaf intervals may be configured by a media access control layer (MAC) control message sent between an MBS and an SBS. For example, an MBS may determine appropriate silent and deaf intervals for each device and communicate the interval in a message.

The use of silent and deaf intervals is transparent to MSSs allowing the use of standardized wireless protocols in the MSSs, reducing overall cost of the system.

Figure 2:
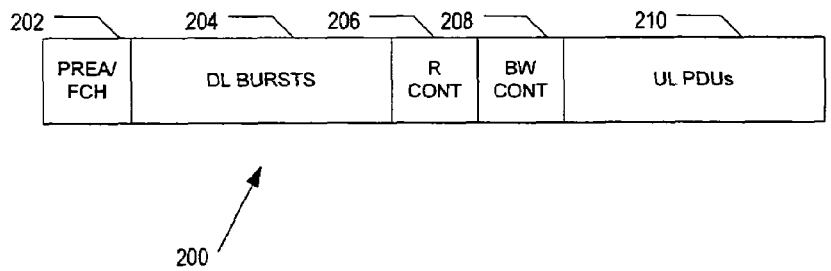
FIG. 2 illustrates a typical frame structure for a wireless system.

FIG. 2 illustrates a typical frame structure for a wireless system. Frame 200 is a time division duplex (TDD) frame. Frame 200 includes preamble/FCH interval 202, downlink bursts interval 204, ranging contention interval 206, bandwidth contention interval 208 and uplink PDUs interval 210. Intervals 202 and 204 form a downlink portion of frame 200 where data is sent down stream, for example, from MBS 102 to SBS 104 or from SBS 104 to MSS 110. Intervals 206, 208, and 210 form an uplink portion of frame 200 where data is sent up stream, for example, from SBS 104 to MBS 102 or from MSS 110 to SBS 104. The duration or length of frame 200 is typically fixed (for example, 5 milliseconds or specified as a fixed number of OFDM symbols) for all communications in the network.

In TDD mode, a channel may carry multiple service flows of data between an MBS and one or more SBSs or an SBS and one or more MSSs. In certain embodiments, each service flow may include a connection ID, quality of service (QoS) class, and/or other flow specific parameters. In the downlink (for example, from the MBS to the SBSs or the SBS to the MSSs), both data from the service flows and/or control messages may be transmitted. In various embodiments, a downlink map and/or an uplink map may be transmitted. The downlink map may describe to the receiving stations where their data is to be found in the downlink subframe, and which burst profile should be used to decode it. The uplink map may describe to the receiving stations the bandwidth and location in the uplink subframe that has been reserved for their uplink transmissions in the frame.

In the uplink (for example, from a SBS to an MBS or from an MSS to an SBS), packets may be transmitted in the regions of uplink subframe as specified in the uplink map received. These packets may contain data from service flows and control messages, including additional bandwidth requests.

An MBS or an SBS may therefore include a scheduler responsible for scheduling packet transmissions in the downlink and bandwidth grants for the uplink. Thus the MBS or SBS may manage queues of service flow data from high-level protocols and queues of bandwidth requests received, construct the uplink and downlink maps and assemble the frame data structure which may be subsequently encoded by the physical layer.

Figure 3:
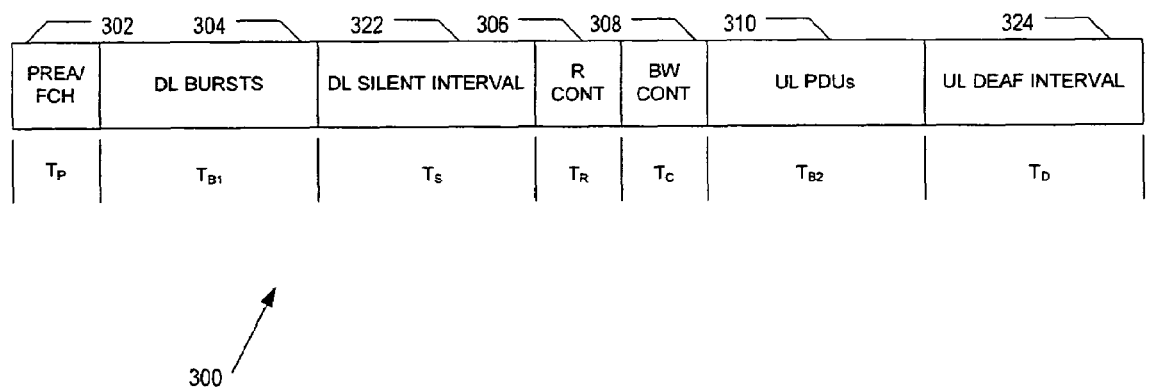
FIG. 3 illustrates a frame structure used for cooperative scheduling according to an embodiment of the present invention.

FIG. 3 illustrates a frame structure used for cooperative scheduling according to an embodiment of the present invention. Frame 300 includes preamble/FCH interval 302, downlink bursts interval 304, ranging contention interval 306, bandwidth contention interval 308 and uplink PDUs interval 310, similar to intervals 202-210 of frame 200. A silent interval 322 is included with the downlink portion of frame 300. A deaf interval 324 is included with the uplink portion of frame 300. The duration of time for each interval is designated as $T_P$, $T_{B1}$, $T_S$, $T_R$, $T_C$, $T_{B2}$, and $T_D$ for preamble/FCH interval 302, downlink bursts interval 304, silent interval 322, ranging contention interval 306, bandwidth contention interval 308, uplink PDUs interval 310, and deaf interval 324, respectively. Upper case T identifies an interval of a master frame, that is, a frame between an MBS and an SBS. A lower case t identifies an interval of a slave frame, that is, a frame between an SBS and an MSS. These designations are used in FIG. 4 and FIG. 5 as well.

According to an embodiment of the present invention, transmissions are not sent in the downlink silent interval of a particular frame. In addition, transmissions are not received in the uplink deaf interval of a particular frame. Note that master and slave frames may overlap in time. Thus, during a silent or deaf interval of a master frame, transmissions may be sent or received in a slave frame. According to an embodiment of the present invention, silent and deaf intervals are created by action on the part of a scheduler and may not require modifications to an existing wireless standard.

Although silent and deaf intervals are illustrated according to time division in FIG. 3, according to an embodiment of the present invention, the silent and deaf intervals may be allocated according to one or more OFDM subchannels. The invention is not limited in this respect.

Figure 4:
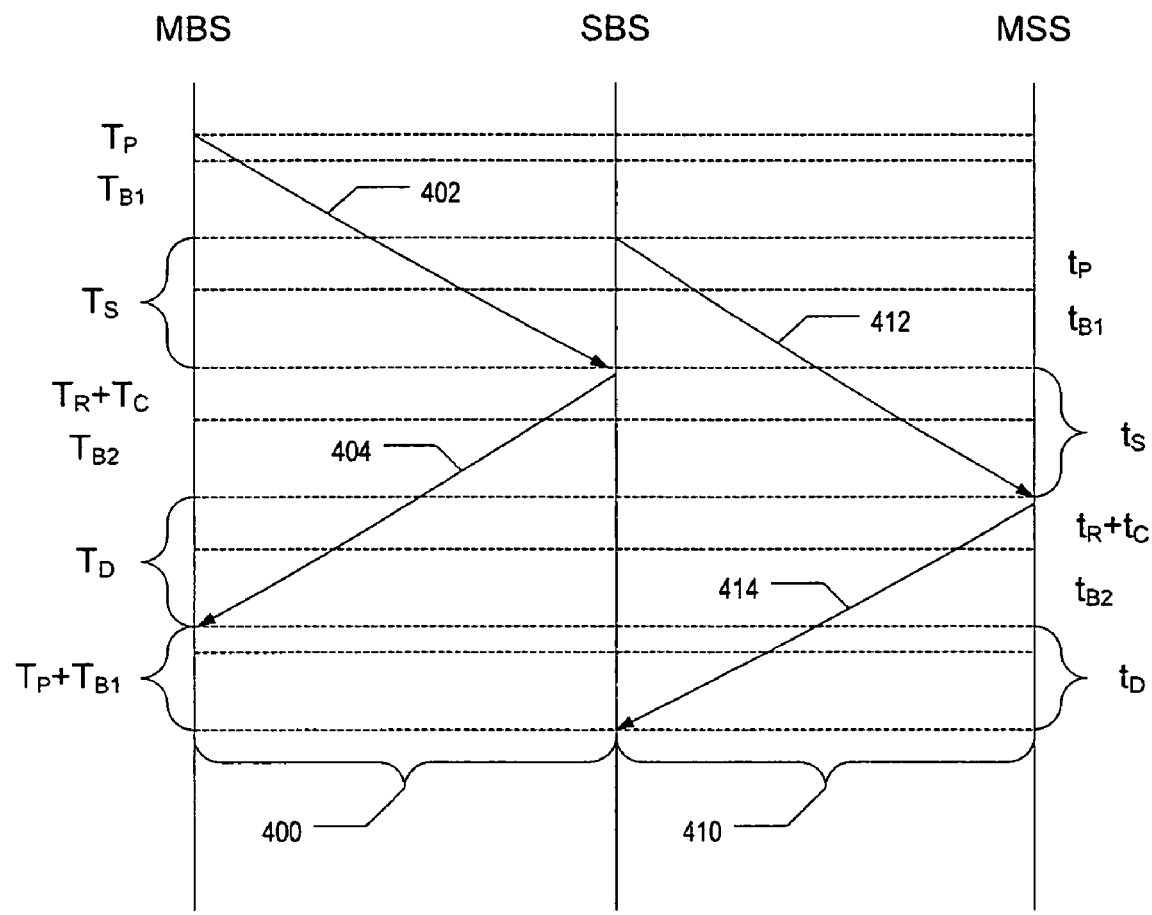
FIG. 4 illustrates an example of cooperative scheduling in a wireless system according to an embodiment of the present invention.

FIG. 4 illustrates an example of cooperative scheduling in a wireless system according to an embodiment of the present invention. A master frame 400 between an MBS and an SBS overlaps in time with a slave frame 410 between the SBS and an MSS. Master frame 400 includes a downlink portion illustrated by arrow 402 and an uplink portion illustrated by arrow 404. Slave frame 410 includes a downlink portion illustrated by arrow 412 and an uplink portion illustrated by arrow 414.

A silent interval $T_S$ in the downlink portion of master frame 400 coincides with a transmitting portion ($t_P$ and $t_{B1}$) of the downlink portion of slave frame 410. Here, the MBS is not transmitting while the SBS is transmitting to the MSS. A deaf interval $T_D$ in the uplink portion of master frame 400 coincides with a receiving portion ($t_R+t_C$ and $t_{B2}$) of the uplink portion of slave frame 410. Here, the MBS is not receiving while the MSS is transmitting to the SBS.

A silent interval $t_S$ in the downlink portion of slave frame 410 coincides with a transmitting portion ($T_R+T_C$ and $T_{B2}$) of the uplink portion of master frame 400. Here, the SBS is not transmitting to the MSS while the SBS is transmitting to the MBS. A deaf interval $t_D$ in the uplink portion of slave frame 410 coincides with a receiving portion ($T_P$ and $T_{B1}$) of the uplink portion of master frame 400. Here, the SBS is not receiving from the MSS while the MBS is transmitting to the SBS (not shown).

As illustrated in FIG. 4, it is noted that $$T_S=tP+t_{B1},$$

$$T_D=t_R+t_C+t_{B2},$$

$$t_S=T_R+T_C+T_{B2}, \text{ and}$$

$$t_D=T_P+T_{B1}.$$

Further, if T is the length of a master frame without silent or deaf intervals, $T_m$ the length of master frame 400, t the length of a slave frame without silent or deaf intervals, and $t_m$ the length of slave frame 410, then $$T_m=T+t=t_m.$$

According to one embodiment of the present invention, master frame 400 and slave frame 410 are the same length, and out of phase by time $T_P+T_{B1}$. Because master frame 400 leads slave frame 410, the SBS may determine the length of the phase shift and determine the values of $t_S$ and $t_D$ and schedule the silent and deaf intervals for slave frame 410. The overhead imposed on master frame 400 is the length of slave frame 410 without the silent and deaf intervals, and the overhead imposed on slave frame 410 is the length of master frame 400 without the silent and deaf intervals.

Figure 5:
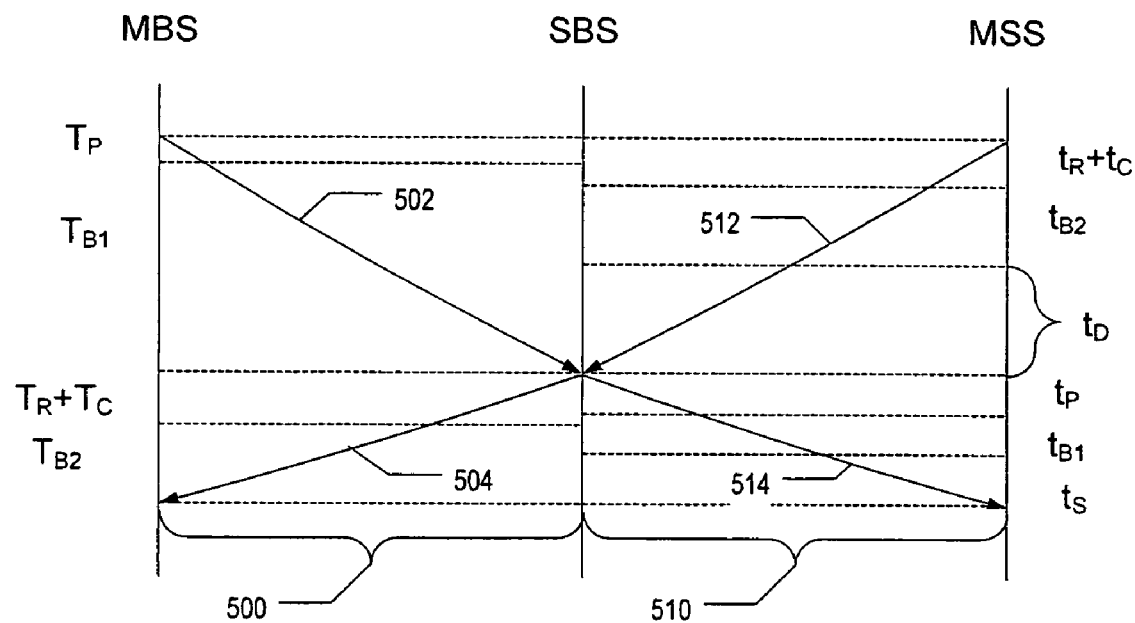
FIG. 5 illustrates another example of cooperative scheduling in a wireless system according to an embodiment of the present invention.

FIG. 5 illustrates another example of cooperative scheduling according to an embodiment of the present invention. A master frame 500 between an MBS and an SBS overlaps in time with a slave frame 510 between the SBS and an MSS. Master frame 500 includes a downlink portion and an uplink portion illustrated by arrow 502 and arrow 504, respectively. Slave frame 510 includes an uplink portion and a downlink portion illustrated by arrow 512 and arrow 514, respectively.

Master frame 500 and slave frame 510 are scheduled out of phase such that the downlink portion of master frame 500 coincides with the uplink portion of slave frame 510 and the uplink portion of master frame 500 coincides with the downlink portion of slave frame 510. If the coinciding portions of master frame 500 and slave frame 510 are of similar length, the scheduling is very efficient and minimal if any deaf intervals are needed. For portions of differing lengths, silent or deaf intervals are used as padding such that the coinciding portions are the same length.

Referring to FIG. 5, slave frame 510 has downlink and uplink transmitting portions that are shorter than the corresponding uplink and downlink portions of master frame 500. The slave frame 510 uses deaf and silent intervals of amounts $$t_D=t_P+T_{B1}-t_P-t_C-t_{B2} \text{ and}$$

$$t_S=T_R+T_C+T_{B2}-t_P-t_{B1}.$$

Figure 6:
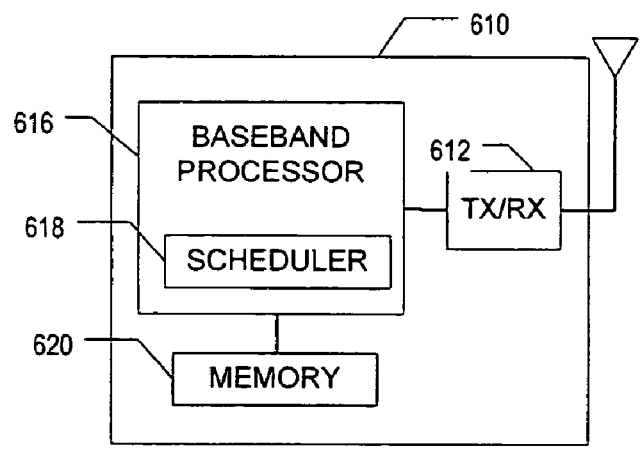
FIG. 6 illustrates a base station architecture according to an embodiment of the present invention.

FIG. 6 illustrates a base station architecture according to an embodiment of the present invention. A bases station 610 may be a master base station or a slave base station. Base station 610 may include a wireless transceiver 612 to couple to one or more antennas 614 and to a baseband processor 616. Baseband processor 616 includes MAC and PHY layer processing. Further, baseband processor 616 includes a scheduler 618. Baseband processor 616 in one embodiment may include a single processor, or alternatively may include a baseband processor and an applications processor, although the scope of the invention is not limited in this respect. Baseband processor 616 may couple to a memory 620 which may include volatile memory such as DRAM, non-volatile memory such as flash memory, or alternatively may include other types of storage such as a hard disk drive, although the scope of the invention is not limited in this respect. Some portion or all of memory 620 may be included on the same integrated circuit as baseband processor 616, or alternatively some portion or all of memory 620 may be disposed on an integrated circuit or other medium, for example a hard disk drive, that is external to the integrated circuit of baseband processor 616, although the scope of the invention is not limited in this respect.

As illustrated, cooperative scheduling of deaf and silent intervals during master and slave frames avoids spectral range issues and slave base station self-interference.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method comprising:

scheduling a first frame for wireless communications between a first device and a third device in a first network; and scheduling a second frame for wireless communications between a second device and the third device in a second network, wherein the third device is a member of both the first and second networks;

wherein the first frame includes a first portion for transmitting a first preamble from the first device to the third device, a second portion in which the first device is not to transmit, a third portion for transmitting from the third device to the first device, and a fourth portion in which the first device is to ignore any received transmissions;

wherein the second frame includes a fifth portion for transmitting a second preamble from the third device to the second device, a sixth portion in which the second device is not to transmit, a seventh portion for transmitting from the second device to the third device, and an eighth portion in which the second device is to ignore any received transmissions;

wherein the first and second frames partially overlap in time such that the second portion coincides in time with the fifth portion, the third portion coincides in time with the sixth portion, and the fourth portion coincides in time with the seventh portion.

2. The method as recited in claim 1, wherein the first portion occurs during a downlink portion of the first frame and the third portion occurs during an uplink portion of the first frame.

3. The method as recited in claim 1, wherein the fifth portion occurs during a downlink portion of the second frame and the seventh portion occurs during an uplink portion of the second frame.

4. The method as recited in claim 1, wherein the second portion occurs during a downlink portion of the first frame and the fourth portion occurs during an uplink portion of the first frame.

5. The method as recited in claim 1, wherein the sixth portion occurs during a downlink portion of the second frame and the eighth portion occurs during an uplink portion of the second frame.

6. The method as recited in claim 1, wherein the first device is a master base station, the second device is a mobile subscriber station, and the third device is a slave base station.

7. The method as recited in claim 1, wherein the scheduling is by the third device.

8. The method as recited in claim 1, wherein the scheduling is communicated by a media access control layer (MAC) control message.

9. An apparatus comprising:

a wireless interface; and a scheduler to schedule a first frame for wireless communications between a first device and a third device in a first wireless network and to schedule a second frame for wireless communications between a second device and the third device in a second wireless network wherein the third device is a member of both the first and second networks;

wherein the first frame includes a first portion for transmitting a first preamble from the first device to the third device, a second portion in which the first device is not to transmit, a third portion for transmitting from the third device to the first device, and a fourth portion in which the first device is to ignore any received transmissions;

wherein the second frame includes a fifth portion for transmitting a second preamble from the third device to the second device, a sixth portion in which the second device is not to transmit, a seventh portion for transmitting from the second device to the third device, and an eighth portion in which the second device is to ignore any received transmissions;

wherein the first and second frames partially overlap in time such that the second portion coincides in time with the fifth portion, the third portion coincides in time with the sixth portion, and the fourth portion coincides in time with the seventh portion.

10. The apparatus as recited in claim 9, wherein the first portion occurs during a downlink portion of the first frame and the third portion occurs during an uplink portion of the first frame.

11. The apparatus as recited in claim 9, wherein the fifth portion occurs during a downlink portion of the second frame and the seventh portion occurs during an unlink portion of the second frame.

12. The apparatus as recited in claim 9, wherein the second portion occurs during a downlink portion of the first frame and the fourth portion occurs during an uplink portion of the first frame.

13. The apparatus as recited in claim 9, wherein the sixth portion occurs during a downlink portion of the second frame and the eighth portion occurs during an uplink portion of the second frame.

14. The apparatus as recited in claim 9, wherein the first device is a master base station, the second device is a mobile subscriber station, and the third device is a slave base station.

15. The apparatus as recited in claim 9, wherein the scheduling is by the third device.

16. The apparatus as recited in claim 9, wherein the scheduling is communicated by a media access control layer (MAC) control message.

17. The apparatus of claim 9, further comprising:

one or more antennas to communicate to a wireless network; and a transceiver to communicate to a wireless device by the one or more antennas.

* * * * *

UNITED STATES PATENT AND TRADEMARK OFFICE
CERTIFICATE OF CORRECTION

PATENT NO. : 7,580,386 B2
APPLICATION NO. : 11/109901
DATED : August 25, 2009
INVENTOR(S) : Neal Conrad Oliver Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 381 days.

Signed and Sealed this

Fourteenth Day of September, 2010

David J. Kappos
*Director of the United States Patent and Trademark Office*